Patented July 24, 1928.

1,678,107

UNITED STATES PATENT OFFICE.

LEONHARD DEUTSCH AND ISAK THORN, OF VIENNA, AUSTRIA, ASSIGNORS TO THE SELDEN COMPANY, OF PITTSBURGH, PENNSYLVANIA, A CORPORATION OF DELAWARE.

PROCESS OF PRODUCING LIGHT-COLORED AND COLOR-FAST, HARD, INFUSIBLE, AND INSOLUBLE PRODUCTS OF CONDENSATION OF PHENOLS AND ALDEHYDES.

No Drawing. Application filed September 15, 1923, Serial No. 662,997, and in Yugoslavia September 28, 1922.

The known processes of condensation carried out with phenols and aldehydes often result in products which are too dark and become too highly colored and are used for technical purposes only, such as electric insulating material and the like. The possibility of using them for technical or industrial articles or objects, as it is the case with celluloid or galalith (casein formaldehyde condensation product), is rendered possible by our new discovery, that the discoloration is not so much a consequence of the process of condensation but is caused by the impurities of the original materials, e. g. inorganic (metallic salts, particularly of copper and iron) as well as organic (the higher homologues of the phenol, carbohydrates, thiocompounds and so forth). By employing pure raw materials it has been possible to produce very light-colored condensation products which acquire pure tones of color with coal-tar or aniline dyes.

It has heretofore been considered necessary, particularly in alkaline condensations, to use raw material of the greatest purity as even small quantities of the impurities mentioned will discolor the final product. It is thus possible by avoiding an iron or copper vessel and by using very pure chemicals, such as freshly distilled or synthetic phenol and formaldehyde dissolved in distilled water, to obtain light colored condensation products. Some wash or extraction processes have also been proposed to remove the impurities. These processes are expensive and in many cases the yield is greatly reduced.

We have discovered that the mentioned undesirable discoloring compounds are decomposed or disintegrated by strong acids, but the presence of such acids in the product of condensation results in a rapid subsequent darkening and further with such products it is very difficult to regulate the hardening process.

According to the present invention, we have found that while discoloring impurities are substantially unaffected by reducing or oxidizing agents in most weakly acid, neutral or alkaline media, boric acids and their salts are an exception. Thus, if small quantities of boric acid compounds such as for example borax, are added to the mixture of phenol and aldehyde before condensation no discoloration will result on the subsequent addition of the alkaline condensation agent and during the subsequent processes of condensation and hardening.

A further procedure consists in that the said compounds are added after the completion of the first reaction and the clarification will take place at a later stage of the process of condensation.

If it is desired that the clarification shall last also if the finished products lie for a longer period it is of advantage to acidify the condensed product before the hardening with weak acids and in such quantities, that the acid-surplus does not accelerate the process of hardening or act as a means of condensation.

*Example 1.*

1 kilogram of phenol and 1 kilogram of formaldehyde are brought to reaction with 10 to 20 grammes of sodium carbonate, now 20 to 50 grammes of borax are added and the whole is cooled for half an hour, 15 to 50 grammes of glacial acetic acid are added and treated as above.

*Example 2.*

1 kilogram of phenol and 1 kilogram of formaldehyde as above are condensed with 10 to 20 grammes of sodium carbonate, 10 to 50 grammes of boric acid are added, the water is expelled and hardened as before.

We claim:

1. A process of producing light colored and color fast, hard, infusible and insoluble products of condensation from phenols and aldehydes consisting in subjecting the same to condensation with an alkali and subsequently adding to the product of reaction boric acid in order to form the salt of this acid.

2. A process of producing light colored and color fast, hard, infusible and insoluble condensation products from a phenol and an aqueous solution of an aldehyde, consisting in subjecting the same to condensation with alkali carbonate and subsequently adding a boric acid material to the product of reaction.

In testimony whereof we affix our signatures.

DR. LEONHARD DEUTSCH.
ING. ISAK THORN.